United States Patent

[11] 3,573,496

[72] Inventors Joseph A. Lake, Jr.
Lincoln Park, N.J.;
Hannon S. Yourke, Poughkeepsie, N.Y.
[21] Appl. No. 776,947
[22] Filed Nov. 19, 1968
[45] Patented Apr. 6, 1971
[73] Assignee International Business Machines Corporation
Armonk, N.Y.

[54] DC SENSE AMPLIFIER
8 Claims, 1 Drawing Fig.

[52] U.S. Cl. .......... 307/235, 328/147, 330/29, 330/30
[51] Int. Cl. .......... H03k 5/20
[50] Field of Search .......... 307/235; 330/30, 29, 69; 328/146, 147

[56] References Cited
UNITED STATES PATENTS

| | | | |
|---|---|---|---|
| 3,333,262 | 7/1967 | Orsen | 307/235 |
| 3,428,827 | 3/1969 | Berry | 307/235 |
| 3,453,554 | 7/1969 | Shoemaker | 330/69 |

*Primary Examiner*—Donald D. Forrer
*Assistant Examiner*—David M. Carter
*Attorneys*—Hanifin and Jancin and James E. Murray

ABSTRACT: This specification describes a comparator for comparing memory sense signals with a reference potential and for providing an output indicative of whether the sense signals are larger or smaller than the reference potential. The comparator includes a differential circuit that compares the output of a signal amplifier, for the sense signals, to the voltage drop across a forward biased diode. Simultaneously, the output of a model or reference amplifier, which amplifies the reference potential is compared to the diode voltage drop and the output levels of the model amplifier and the signal amplifier are simultaneously adjusted by a feedback network until the output of the model amplifier is equal to the diode voltage drop. The model and sense amplifiers are practically identical in design and are produced on the same monolithic chip so that the comparison by the differential circuit indicates whether or not the signal on the sense line exceeds the reference potential.

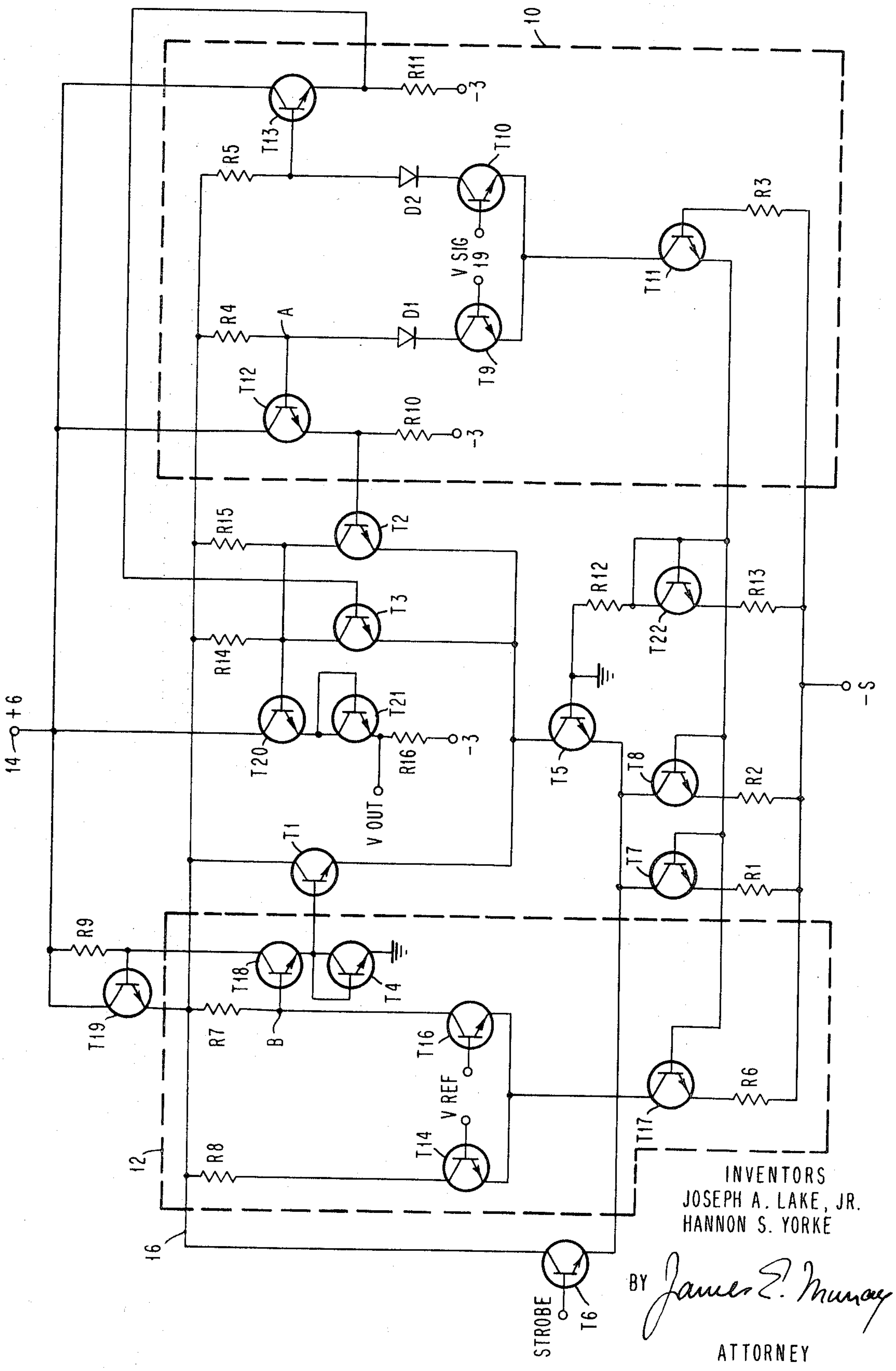
INVENTORS
JOSEPH A. LAKE, JR.
HANNON S. YORKE
BY James E. Murray
ATTORNEY

DC SENSE AMPLIFIER

BACKGROUND OF THE INVENTION

The present invention relates to comparators and more particularly to comparators for use in memory sense amplifiers.

One problem with comparators is that it is difficult to obtain an accurate comparison between a reference level and a signal to be compared. With the advent of monolithic circuits this problem is further aggravated by the fact that it is difficult to maintain close tolerances on the absolute values of monolithic circuit element characteristics. However it is known that the characteristics of circuit elements on the same monolithic chip track each other very closely and that this chip tracking ability of monolithic circuits can be employed to obtain very accurate circuits.

SUMMARY

In accordance with the present invention a comparator is provided that relies on its accuracy on the tracking ability of elements produced on monolithic chips as opposed to the absolute values of the characteristics for those elements. This comparator includes a differential circuit that compares the output of a signal amplifier, which amplifies the signals to be compared, to the voltage drop across a forward biased diode. The output of a model, or reference, amplifier, which amplifies the reference potential, is then compared to the diode drop and the output levels of the model amplifier and the reference amplifier are adjusted by a feedback network until the output of the model amplifier equals the diode voltage drop. The model and sense amplifiers are practically the same in design. Therefore, when they are produced on the same monolithic chip they track each other so as to enable a very accurate comparison to be made between the reference potential and the signals.

Therefore it is an object of the present invention to provide an accurate comparator.

It is another object of the invention to provide a comparator which is designed to take advantage of the tracking characteristics of circuit elements produced on the same monolithic chip.

It is a further object of the invention to provide a comparator which can be mass-produced in monolithic form.

DESCRIPTION OF THE DRAWINGS

The foregoing and other objects, features and advantages of the invention will be apparent from the following more particular description of the preferred embodiment of the invention as illustrated in the accompanying drawing (FIGURE) which shows a memory sense amplifier employing the present invention.

Referring to the FIGURE, transistor T1 is connected to transistors T2 and T3 to form a differential switch. If the potential at the base of either transistor T2 or T3 exceeds the potential at the base of transistor T1, that transistor T2 or T3 conducts. However, if the potential at the bases of both transistors T2 and T3 is less than the potential at the base of transistor T1, transistor T1 conducts. The base of transistor T1 is connected to ground through the base to emitter path of transistor T4 while the bases of the transistors T2 and T3 are connected to different outputs of a signal amplifier 10. In effect then, what the differential switch is doing is comparing the magnitude of the outputs of the signal amplifier 10 with a fixed potential, which in this case is a diode drop above ground potential. This comparison and its function will be discussed in more detail later.

However, for the moment, let us look at transistor T5. This transistor T5 forms with transistor T6 another differential switch which is supplied current from current source consisting of transistors T7 and T8 and resistors R1 and R2. In order for transistors T1, T2 and T3 to operate they must be supplied current through transistor T5. However, when the base of T6 is biased higher than the base of transistor T5, or when the base of transistor T6 is raised above ground potential, current flows through transistor T6 and not through transistor T5. To energize transistors T1, T2 and T3, the base of transistor T6 is biased below ground. Then transistor T5 conducts to supply the current to transistors T1, T2 and T3. The raising or lowering of the voltage at the base of transistor T6 is called strobing. This "strobing" of the differential switch is done to keep the output Vout of the switch quiet until the desired time for determining the magnitude of Vout. Therefore, transistor T6 is normally biased higher than the base of transistor T5 to cut off the current supplied to transistors T1, T2 and T3 so that the output Vout will be insensitive to voltages on the bases of transistors T1, T2 and T3. However, when the output Vout is to be sensed, the strobe voltage at the base of transistor T6 will be lowered below ground causing the current flowing through transistor T6 to flow through transistor T5 thereby energizing the conducting one of transistors T1, T2 or T3.

As pointed out earlier, the bases of transistors T2 and T3 are connected to the outputs of a signal differential amplifier 10 so as to compare the magnitude of those outputs with the magnitude of the potential on the base of transistor T1 which in fact is one diode drop above ground level. The signal differential amplifier 10 amplifies signals supplied to the bases of transistors T9 and T10 such as signals produced by reading a memory sense line. For this purpose transistors T9 and T10 receive current supplied through a current source consisting of transistor T11 and resistor R3. When the base of transistor T9 is higher than the base of transistor T10, transistor T9 will conduct more current than transistor T10. Alternately when the base of transistor T10 is higher than the base of transistor T9, transistor T10 will conduct more current than transistor T9. The current through transistors T9 and T10 produces voltage drops across the resistor R4 and R5. The voltage drops across resistors R4 and R5 are transmitted to the outputs of the sense amplifier 10 by transistors T12 and T13 respectively. When either output of the sense amplifier 10 exceeds a diode drop above ground it will cause either transistor T2 or T3 to conduct while transistor T1 is biased off. However if neither the base of transistor T2 or T3 is biased higher than one diode drop above ground, transistor T1 will conduct to the exclusion of transistors T2 and T3.

It can be seen from the above description that the potential at the common collectors of transistors T2 and T3 gives a fine indication as to whether the voltage at either output of the sense amplifier 10 is greater or less than one diode drop above ground level. While in some cases this comparison may serve some purpose. In the case of memories the comparison needed is not between the output of the signal amplifier and some preset voltage above the ground level but between the input signals Vsig of the amplifier 10 and some selected reference potential Vref. In accordance with the present invention, this is accomplished by adjusting the output levels of the signal differential amplifier 10 as a function of the selected reference potential so as to obtain an accurate comparison between the reference potential and the signal potential. For this purpose a differential model or reference amplifier 12 is provided. Like the differential signal amplifier the differential reference amplifier has two transistors T14 and T16 connected in a long tailed differential amplifier configuration with transistor T17 and resistor R6 serving as the current source for the long tailed pair. The reference voltage is applied between the bases of transistors T14 and T16, with the base of transistor T16 biased less positive by the reference voltage than the base of transistor T14. Thus transistor T16 conducts less than transistor T14 producing a smaller voltage drop across the resistor R7 than across resistor R8. The voltage drop across resistor R7 is coupled to the output of the differential reference amplifier by transistor T18.

The output of the reference amplifier 12 is connected to the base of transistor T1 by the emitter of transistor T18 while the collector of transistor T18 is connected through a resistor R9 to the positive terminal 14 of the power supply providing the operating potential to the whole comparator circuit. Conduction through resistor R9 determines the potential of the driving force supplied to both the signal amplifier 10 and the sense amplifier 12. This driving potential is applied from the positive terminal 14 through the collector to emitter path of transistor T19 to the bus bar 16. The base of transistor T19 is connected to the collector of transistor T18. As a result of this connection, when transistor T18 conducts it develops a voltage across resistor R9 which biases transistor T19 at a conductive level. As transistor T19 conducts it supplies voltage to the bus bar 16 that energizes the two amplifiers 10 and 12. The magnitude of potential supplied depends on how heavily transistor T18 conducts. If transistor T18 conducts heavily, the voltage across resistor R9 increases biasing transistor T19 less conductive thus dropping the potential on the bus bar 16. If transistor T18 conducts less it decreases the voltage drop across resistor R9 causing transistor T19 to conduct more and increase the voltage on the bus bar 16. The potential on the bus bar 16 in turn determines the state of transistor T18 by controlling the potential drop across resistor R9 produced by the conduction of transistor T16. Therefore the arrangement of transistors T18 and T19 and resistors R7, R8 and R9 is such that transistor T19 will conduct and supply potential to the bus bar 16 at a level to maintain transitor T18 barely conducting. If transistor T18 tends to conduct more it biases transistor T19 less conductive which then decreases the potential on the bus bar 16 to reduce conduction through transistor T18. If transistor T18 tends to conduct less it biases transistor T19 more conductive which then increases the potential on the bus bar to increase conduction through transistor T18.

Except for diodes D1 and D2, the amplifiers 10 and 12 are identical and are produced on the same monolithic chip. This means that the current through resistor R4 is equal to the current through resistor R7 and therefore biases node A at the same potential as node B when the potential difference between transistors T9 and T10 equals the potential difference between T14 and T17 both in polarity and magnitude. Therefore in this situation both nodes A and B are one VBE drop above the potential on the base of transistor T1. Since transistors T18 and T12 are substantially identical it means that the VBE of transistor T18 and the VBE of transistor T12 are equal. Thus the potential at the base of transistor T2 or the bases of both transistors are one diode drop above ground. Therefore you can see that with the feedback arrangement described the signal potential between the emitters of transistors T9 and T10 is compared with the reference potential between the emitters of T14 and T16. When the potential of the signal is greater than the potential of the reference transistor T2 will conduct and when it is less than the potential of the reference, T1 conducts. Of course, for opposite polarity signals at the bases of transistors T9 and T10, the same arrangement holds true for T3 and T1.

The output potential Vout of the comparator therefore indicates whether the signal Vsig is greater or less than the reference Vref. When the signal is less in magnitude than the reference, the output Vout will be up and when the signal is greater in magnitude than the reference, the output Vout will be down. Transistors T20 and T21 were added to make Vout polarity sensitive. That is when the signal is less than the reference, the output Vout will be positive and when the signal is greater than the reference, the output Vout will be negative.

The comparator can be built as shown in the drawing. Some typical values for the resistors would be as follows:

R8, R7, R4, R5, R14, R15=330 ohms.
R9, R16=1.5 K.
R10, R11=1.8 K.
R1, R2, R3, R6, R16=461 ohms.
R12=523 ohms.

While the invention has been particularly shown and described with reference to preferred embodiments thereof it will be understood by those skilled in the art that various changes in form and details may be made therein without departing from the spirit and scope of the invention.

We claim:

1. A comparator for comparing the magnitude of signals to a reference level comprising:

a. a variable gain signal amplifier having an input adapted to receive the signals and an output a function of both the signals and the gain of the amplifier;

b. comparator switching means for comparing the output of the signal amplifier with a fixed level and providing a comparator output signal indicative of whether the output of the signal amplifier is larger or smaller than the fixed level;

c. a variable gain reference amplifier having its input biased by the reference level and its output a function of both the reference level and the gain of the reference amplifier; and d. feedback means for adjusting the gains of both the variable gain signal amplifier and the variable gain reference amplifier to maintain at a fixed potential the potential difference between the output of the variable gain reference amplifier and the fixed level irrespective of the potential of the reference level and to cause gain of the signal amplifier to track the gain of the reference amplifier so that the gain of both amplifiers is referenced to the fixed level.

2. The comparator of claim 1 wherein said feedback means is a voltage regulation circuit, including:

a. a source of potential for driving the model and signal amplifiers;

b. a first transistor with its emitter-to-collector potential coupling the source of potential to the reference and signal amplifiers;

c. an output load resistor for the reference amplifier connected in series with the emitter-to-collector path of the first transistor and the source of potential;

d. a second transistor with its base-to-collector path coupled across said output load resistor and the base-to-emitter path of the first transistor;

e. a second resistor coupling the base of the first transistor to the source potential; and f. means coupling the emitter of the second transistor to the source of fixed potential so that the potential supplied to the reference signal amplifiers is maintained at a level that keeps the second transistor barely conducting.

3. The comparator of claim 1 wherein said comparison means is a differential current switch having two transistors connected differentially so that the transistor with the highest base potential conducts current to the exclusion of the other transistor and wherein the output of the reference amplifier is coupled to the base of the first transistor of the switch, the output of the signal amplifier is connected to the base of the second transistor of the switch and the output of the switch is taken from the collector of the second transistor.

4. The comparator of claim 3 wherein the source of current for said differential current switch comprises a differential switching means for switching current to and from said differential current switch to strobe the output of said differential current switch.

5. The comparator of claim 1 wherein said reference and signal amplifiers are each long-tailed pair differential amplifiers and include separate resistance means each coupled at one end to the collector of one of the transistors in the long-tailed pairs and to the feedback means at the other end.

6. The structure of claim 5 wherein said reference and signal amplifiers each includes an output transistor with its base coupled to the collector of one of the long-tailed pair transistors of the particular amplifier and its emitter coupled to the output of the particular amplifier.

7. The structure of claim 6 including a bias resistor coupled between a source of driving potential and the collector of said output transistor of the reference amplifier and feedback means for coupling the resistive means of the signal and reference amplifiers to the source of driving potential.

8. The structure of claim 7 wherein said feedback means includes a transistor with its collector coupled to the source of driving potential, its emitter coupled to said other end of said resistive means and its base connected to the collector of said output transistor of the reference amplifier.